United States Patent
Palma et al.

[15] 3,701,401
[45] Oct. 31, 1972

[54] TORQUE OVERLOAD SENSING AND INDICATING DEVICE FOR TORQUE LIMITING BRAKE MECHANISM

[72] Inventors: Michael A. Palma, Parsippany; Joseph W. Minarick, Oakland, both of N.J.

[73] Assignee: Curtiss-Wright Corporation

[22] Filed: May 12, 1971

[21] Appl. No.: 142,569

[52] U.S. Cl...............188/134, 116/114 R, 188/1 A, 192/30 W
[51] Int. Cl............................B60t 7/12, F16d 66/00
[58] Field of Search...........116/114 R; 188/1 A, 134; 192/8 R, 30 W

[56] References Cited

UNITED STATES PATENTS

| | | | |
|---|---|---|---|
| 2,334,734 | 11/1943 | Taylor | 188/134 |
| 2,642,970 | 6/1953 | Szekely | 192/30 W UX |
| 3,329,242 | 7/1967 | Minarick et al. | 188/134 |

*Primary Examiner*—Duane A. Reger
*Attorney*—Arthur Frederick and Victor D. Behn

[57] ABSTRACT

A torque overload sensing and indicating device for a torque limiting brake mechanism having a torque limiting and brake means coacting with brake drum means which is connected for limited rotative movement relative to a stationary support to interrupt and arrest transmission of rotation upon a predetermined torque load, the sensing and indicating device comprising at least one spring biased bin axially slidably disposed in the stationary support and a stop member carried by the brake drum means and disposed to abut the pin to restrain movement of the pin in the direction in which it is biased until said predetermined torque load occurs and the brake means engages and rotates the brake drum means through said limited movement.

16 Claims, 6 Drawing Figures

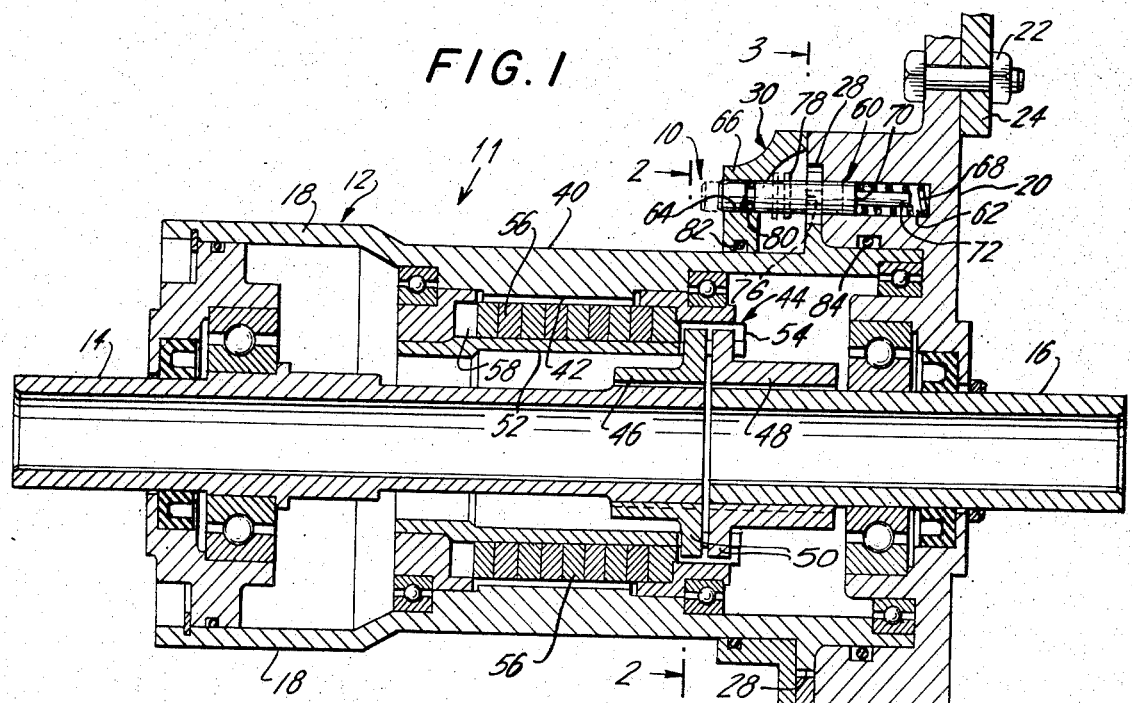
FIG.1
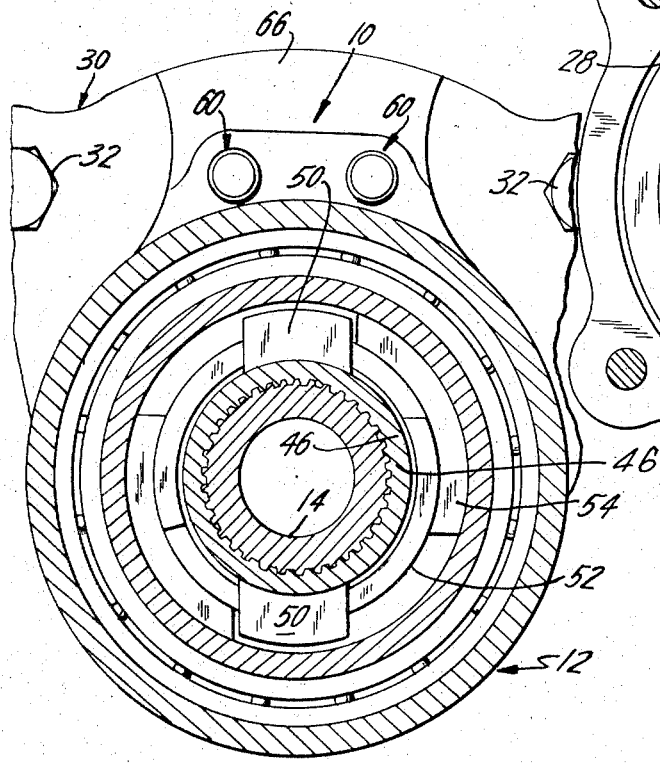
FIG.2
FIG.3
INVENTORS.
JOSEPH W. MINARICK
MICHAEL A. PALMA
BY
Arthur Frederick
ATTORNEY

INVENTORS.
JOSEPH W. MINARICK
MICHAEL A. PALMA
BY
ATTORNEY

TORQUE OVERLOAD SENSING AND INDICATING DEVICE FOR TORQUE LIMITING BRAKE MECHANISM

This invention relates to sensing and indicating means and, more particularly, to a torque overload sensing and indicating means for a torque limiting brake mechanism.

BACKGROUND OF THE INVENTION

In torque limiting brake mechanisms of uni-directional or bi-directional type, such as exemplified in the U.S. Pat. to Minarick et al., No. 3,329,242 and in a copending patent application of Meyer et al., assigned to the same assignee as the aforesaid patent, the actuation of such mechanism due to a torque overload condition cannot be ascertained where the overload condition is momentary or non-permanent. This inability to identify actuation of a torque limiting brake due to a torque overload condition which is indicative of a defect in a component or system is particularly undesirable where the mechanisms are employed as part of the system of aircraft wing flap or slat actuation. In present day large aircraft there may be as many 30 20 to 30 torque limiting brake mechanisms which require ground inspection along with the other components of the systems. This ground inspection of aircraft will be facilitated and safety improved if inspection would reveal which, if any and how many, torque limiting mechanisms were actuated by a temporary torque overload condition.

Accordingly, it is an object of this invention to provide a torque overload sensing and indicating means for a torque limiting brake mechanism, which continues to visually display that the mechanism was actuated by a torque overload condition after the condition terminates or is self-corrected.

It is another object of this invention to provide a torque overload sensing and indicating means for a bi-directional torque limiting brake mechanism which will indicate a torque overload condition when it occurs in either direction of rotation.

A further object of the present invention is to provide a torque overload sensing and indicating device for a torque limiting brake mechanism which can be quickly and easily reset after actuation so as to again function to sense a torque overload condition if such should again occur.

A still further object of this invention is to provide a torque overload sensing and indicating device which can be readily adapted for coaction with a wide variety of torque limiting brake mechanisms.

SUMMARY OF THE INVENTION

Accordingly, the present invention contemplates a torque overload sensing and indicating device for a torque limiting brake mechanism in which rotation is transmitted from an input member to an output member through a torque limiting and brake means, the means functioning, upon a predetermined torque, to engage a braking surface of brake drum means which is connected for limited rotation to a fixed support, to interrupt transmission of rotation by arresting rotation of the output member. The sensing and indicating device comprises an indicating member mounted for reciprocative movement in the fixed support. A biasing means is provided to coact with the indicating member to urge the latter in one direction. Assciated with the brake drum means is a stop means disposed to restrain the indicating member from movement under the urging of the biasing means. The stop means coacts with the brake drum means so that, when the torque limiting and brake means engages the braking surface and effects limited rotation of the brake drum means upon a predetermined excessive torque load, the stop means releases the indicating member for movement under the urging of said biasing means to thus indicate the torque overload condition.

BRIEF DESCRIPTION OF THE DRAWINGS

The invention will be more fully understood from the following detailed description thereof when considered in connection with the accompanying drawing wherein the invention is illustrated by way of example and in which:

FIG. 1 is a longitudinal cross-sectional view of a torque limiting brake mechanism having a torque overload sensing and indicating device according to this invention;

FIG. 2 is a cross-sectional view taken substantially along line 2—2 of FIG. 1;

FIG. 3 is a view in cross-section taken substantially along line 3—3 of FIG. 1;

DESCRIPTION OF THE PREFERRED EMBODIMENT OF THE INVENTION

Figure 4:
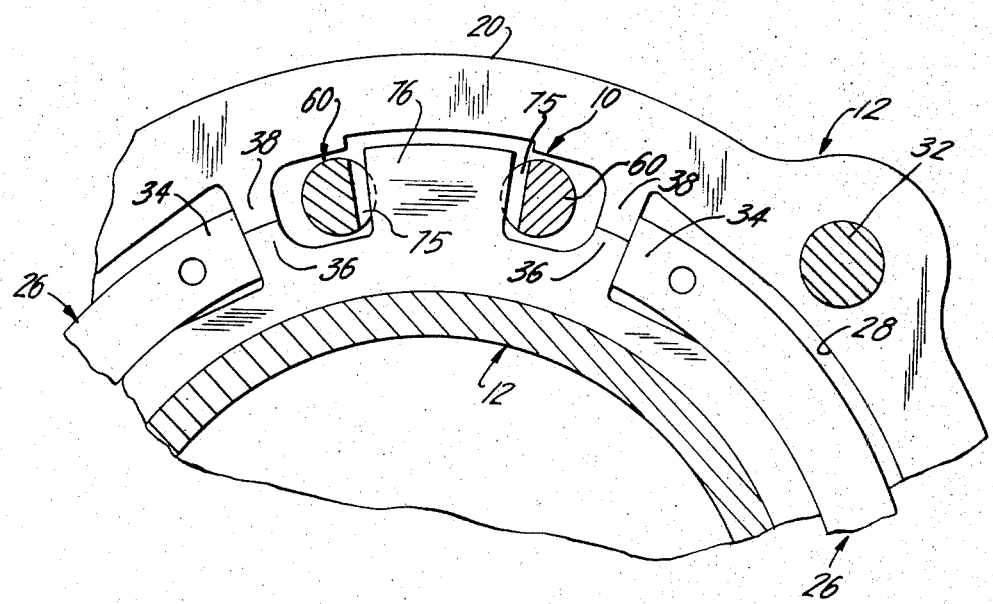
FIG. 4 is an enlarged fragmentary cross-sectional view, similar to FIG. 3 showing the normal or non-overload torque condition of operation.

Now referring to the drawing and, more particularly FIGS. 1 to 3, the reference number 10 generally designates the torque overload sensing and indicating device which coacts with a torque limiting brake mechanism 12 according to this invention.

It is to be understood that while torque limiting brake mechanism 11 is shown and will be described as of the bi-directional type disclosed in the U.S. Pat. No. 3,329,242 to Minarick et al. and a copending Pat. application, Ser. No. 89,168 filed Nov. 13, 1970, the invention is not restricted in such application but may include a wide variety of torque limiting brake mechanisms, as will become apparent, the present invention encompasses uni-directional, as well as bi-directional, torque limiting brake mechanisms.

Torque Limiting Brake Mechanism

The torque limiting brake mechanism 11 as best shown in FIG. 1 comprises a drive or input shaft 14 and a driven or output shaft 16 which shafts are journalled for rotation in a housing 12. The housing includes a stationary support or end wall 20 which is secured through a plurality of bolts 22 (only one of which is shown) to a frame 24. As best shown in FIG. 3, housing 12 is resiliently connected to stationary support 20 for limited rotative movement relative to the latter. The resilient interconnection is provided by a caliper spring 26 which is confined within an interrupted annular chamber 28. The annular chamber 28 is defined by complementary, concentric grooves in housing 12 and stationary support 20 and by an adapter plate 30 which is secured in abutment against stationary support 20 by a plurality of bolts 32. The adapter plate 30 constitutes a component of torque overload sensing and indicating device 10. Each of the opposite ends 34 of caliper spring 26 abut juxtaposed lugs 36 and 38 on housing 12 and stationary support 20, respectively, each of the set of lugs 36 and 38 forming the opposite end walls of chamber 28. The lugs 36 and 38 and caliper spring 26 coact to resiliently restrain rotative movement of housing 12 relative to stationary support 20 as will be more fully explained hereinafter. The housing 12 also may include a brake drum 40 which has an internal, annular braking surface 42. The input shaft 14 and output shaft 16 are drivably connected through a torque limiting and brake subassembly 44 located adjacent to brake drum 40.

The torque limiting and brake subassembly 44 comprises connectors 46 and 48 spline connected respectively to input shaft 14 and output shaft 16 which, through their respective diametrical lugs 50, engage in one direction of rotation a coupling or sleeve 52 and in the opposite direction a second sleeve 54. A helically wound spring 56 is disposed concentrically around sleeve 52 and, at one end, abuts a radially extending abutment on sleeve 52 and, at the opposite end, abuts a similar abutment on sleeve 54. Thus, in both directions of rotation of input shaft 14, rotation is transmitted to output shaft 16, via spring 56, in such a manner as to tend to expand the coils of the spring. Therefore, when the torque load exceeds the predetermined value as established by the spring, the coils expand and engage braking surface 42 to thereby interrupt transmission of rotation by arresting rotation of output shaft 16. When spring 56 engages braking surface 42 a torque force is imposed on the brake drum 40, and, since in this assembly illustrated and described the brake drum is part of housing 12, such torque force is transmitted to the housing. This results in a rotative movement of housing 12 relative to stationary support 20 against the resistance of caliper spring 26, as hereinafter more fully described. To detect and indicate that the torque limiting brake mechanism 12 has experienced a torque overload condition as has been described, the torque overload sensing and indicating device 10 is provided.

Torque Overload Sensing and Indicating Device

Figure 5:
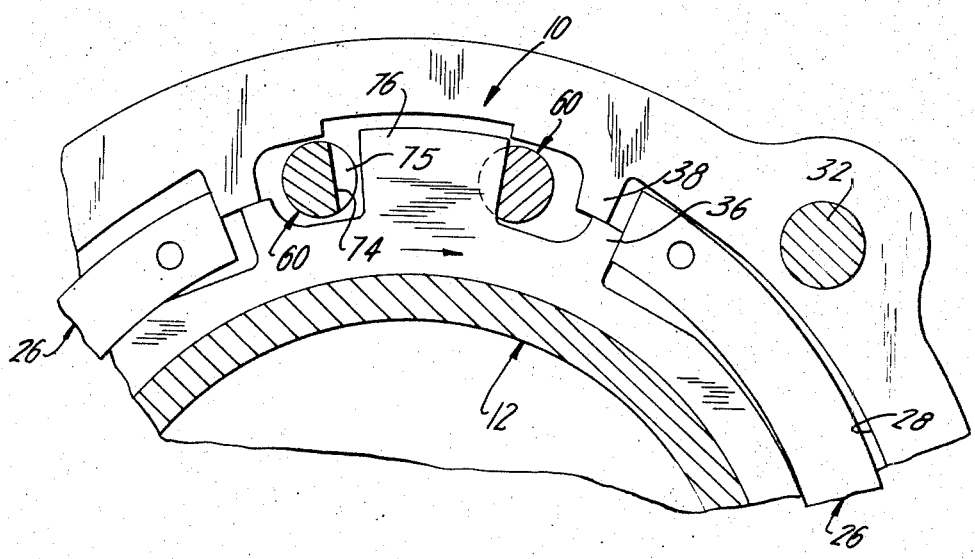
FIG. 5 is a view similar to FIG. 4 showing the torque overload condition of operation.
Figure 6:
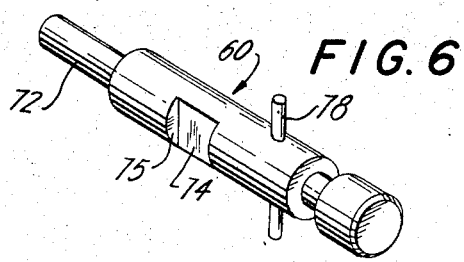
FIG. 6 is an isometric view of the indicating member according to this invention.

The torque overload sensing and indicating device 10 comprises an indicating means which, in the embodiment, herein described, for indicating torque overload in two directions of rotation, consists of two spaced pins 60. Each pin 60 is mounted for longitudinal, reciprocable movement in a recess 62 in stationary support 20 and a hole 64, aligned with recess 62 and located in the wall of a boss portion 66 of adapter plate 30. To urge pin 60 outwardly (to the left as viewed in FIG. 1) a coil spring 68 is disposed in recess 62 to abut, at one end, the bottom of the recess and at the other end bear against an annular shoulder 70 formed on the pin 60 by a reduced diameter end portion 72. As best shown in FIGS. 4 and 6, each pin 60 is provided with a chordal notch or groove 74 which is so located that spring 68 is compressed when the notch 74 is located to receive a tang 76 on housing 12. The tang 76 is dimensioned so that, in the normal torque transmitting condition of operation, the opposite end portions extend into each notch 74 of pins 60 to thus restrain each pin against movement in the direction urged by its associated spring 68. Each notch 74 is dimensioned in depth so that, upon an overload condition and rotative movement of housing 12 relative to stationary support 20, tang 76 can move into a notch 74 sufficiently to move out of the notch 74 of the opposite pin 60 and thereby release the latter as is illustrated in FIG. 5. To limit the outward movement of pins 60 upon release by tang 76, each of the pins is provided with a stop pin 78 which abuts the inner surface of wall 66 of adapter plate 30 when the pin is released. To seal the interstices between each of the pins 60 and its associated hole 64, each pin has an annular groove for receiving an O-ring 80 or other sealing means. Also, the interstices between adapter plate 30 and housing 12 and stationary support 20 and housing 12 is sealed by O-rings or the like 82 and 84, respectively.

Operation

When the torque limiting brake mechanism 11 is functioning to transmit rotation from input shaft 14 to output shaft 16 under normal torque load conditions, pins 60 of torque overload sensing and indicating device 10 are held against longitudinal movement by housing tang 76 which extends into chordal groove 74 of each pin and in abutment against the side wall 75 of groove 74 (see FIG. 4). When a predetermined torque load occurs and spring 56 engages braking surface 42 and thereby rotates housing 12 in a clockwise direction, as viewed in FIG. 5, relative to stationary support 20 and against the resistance of caliper spring 26, tang 76 is rotated out of groove 74 of the left hand pin 60 as seen in FIG. 5. Upon rotation of tang 76 out of abutment against groove wall 75, the pin, under the urging of spring 68, is slid to the left as viewed in FIG. 1 to the dot-dash position. If the torque overload condition ceases, torque limiting brake mechanism 11 can resume normal operation, but the pin 60 which was released upon torque overload remains extended to alert an inspector to the fact that the mechanism 12 experienced a torque overload condition.

The torque overload sensing and indicating mechanism can be readily restored to normal operativeness by merely depressing the extended pin 60 until its chordal groove 74 enters the plane of tang 76. At this moment housing 12 is rotated under the urging of caliper spring 26 to the normal position shown in FIG. 4 where tang 76 again projects into grooves 74 of both pins 60.

It is now believed readily apparent that the present invention provides a unique torque overload sensing and indicating device for a torque limiting brake mechanism, which device is relatively simple and inexpensive to fabricate and assemble. It is a device which remains in a position indicating a torque overload even after such overload torque condition ceases to exist. Furthermore, it is a device which can be quickly and easily reset for further operation.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In combination with a torque limiting brake mechanism having a torque limiting brake means and a brake drum means connected for limited relative movement to a stationary support coacting to interrupt and arrest transmission of rotation upon a predetermined torque load, a torque overload sensing and indicating device comprising:
   a. indicating means disposed for reciprocative movement in said stationary support;
   b. means, biasing said indicating means in one direction; and
   c. stop means coating with said brake drum to restrain said indicating means from movement in said one direction and releasing said indicating means for movement under the urging of said biasing means when said predetermined torque load occurs and said torque limiting brake means and brake drum means coact to rotate the latter.

2. The combination of claim 1 wherein said brake drum means forms part of the housing of said torque limiting brake mechanism.

3. The apparatus of claim 1 wherein said indicating means is at least one elongated pin.

4. The combination of claim 1 wherein said torque limiting brake means includes a helically wound spring.

5. The combination of claim 1 wherein said biasing means is a spring.

6. The combination of claim 1 wherein said torque limiting brake mechanism is bi-directional and said indicating means includes two axially slidable pins coacting with said stop means to be restrained by the latter against movement and each releasable independently of each other depending upon the direction of rotation when the overload torque condition occurs.

7. The apparatus of claim 1 wherein said indicating means is at least one elongated pin having a shoulder thereon and wherein said stop means abuts said shoulder to restrain the pin against axial movement.

8. The apparatus of claim 7 wherein said biasing means is a helically wound spring engaging the pin.

9. The apparatus of claim 1 wherein said stop means is carried by said brake drum means to rotate with the latter.

10. The apparatus of claim 6 wherein said stop means is carried by said brake drum means to rotate with the latter and wherein each of the pins has a shoulder which the stop means engages to restrain movement of said pin until rotatively moved out of engagement with the shoulder upon an overload torque condition.

11. A torque limiting brake mechanism having input and output members interconnected to transmit rotation from the input member to the output member through a coil spring and having a brake drum spaced from and surrounding said coil spring and resiliently connected to a stationary support for limited rotative movement relative to said stationary support, the coil spring functioning upon a predetermined torque load to interrupt rotation between the input and output members and engage said brake drum to arrest rotation of the output member, in combination with a torque overload sensing and indicating device comprising:
   a. indicating means disposed for reciprocative movement in said stationary support;
   b. biasing means engaging said indicating means to urge the latter in one direction of reciprocative movement; and
   c. stop means carried by said brake drum for conjoined rotation with the latter and in rotation transmitting condition operating to engage said indicating means to restrain the indicating means from movement in said one direction and disengage from said indicating means to release the latter for movement under the urging of said biasing means when said predetermined torque load occurs and said brake drum is rotated by engagement of said spring with the brake drum.

12. The apparatus of claim 11 wherein said indicating means is at least one elongated pin.

13. The apparatus of claim 12 wherein said biasing means is a coil spring which abuts the pin to urge it in the said one direction.

14. The combination of claim 11 wherein said torque limiting brake mechanism functions to transmit rotation in both directions and said indicating means includes two spaced parallel elongated pins axially slidable relative to the support and the brake drum and each pin having a shoulder thereon, and wherein stop means is a tang which abuts the shoulder of each pin until rotated out of abutment with one of the shoulders upon a predetermined torque load which causes the coil spring to engage and rotate said brake drum.

15. The combination of claim 11 wherein said indicating means includes at least one elongated pin having a chordal slot therein and wherein said stop means is a radially projecting tang which extends into said slot to abut the pin and restrain thereby the reciprocative movement of said pin.

16. The combination of claim 15 wherein said pin carries a stop to limit movement in said one direction.

* * * * *